US012555760B2

(12) United States Patent
Tiemann et al.

(10) Patent No.: US 12,555,760 B2
(45) Date of Patent: Feb. 17, 2026

(54) METHOD FOR OPTIMIZING A PARAMETER SETTING OF AT LEAST ONE MASS SPECTROMETRY DEVICE

(71) Applicant: Roche Diagnostics Operations, Inc., Indianapolis, IN (US)

(72) Inventors: Benjamin Tiemann, Munich (DE); Daniel Intelmann, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 396 days.

(21) Appl. No.: 18/333,174

(22) Filed: Jun. 12, 2023

(65) Prior Publication Data

US 2023/0326729 A1 Oct. 12, 2023

Related U.S. Application Data

(63) Continuation of application No. PCT/EP2021/085190, filed on Dec. 10, 2021.

(30) Foreign Application Priority Data

Dec. 11, 2020 (EP) .................................... 20213473

(51) Int. Cl.
*H01J 49/00* (2006.01)

(52) U.S. Cl.
CPC ................................ *H01J 49/0009* (2013.01)

(58) Field of Classification Search
USPC .......................................................... 250/282
See application file for complete search history.

(56) References Cited

U.S. PATENT DOCUMENTS

2006/0080040 A1* 4/2006 Garczarek ........... H01J 49/0027 702/19
2019/0227041 A1 7/2019 Dalmia

FOREIGN PATENT DOCUMENTS

CN 111834194 A 10/2020
EP 3425369 A1 1/2019
(Continued)

OTHER PUBLICATIONS

International Search Report; European Patent Office; International Application No. PCT/EP2021/085190; Apr. 4, 2022; 5 pages.
Written Opinion of the International Searching Authority; European Patent Office; International Application No. PCT/EP2021/085190; Apr. 4, 2022; 10 pages.
Stone, Peter JW et al.; Determination of Pesticides and Mycotoxins in Cannabis Flower as Defined by Legalized U.S. State Recreational Cannabis Regulations; May 15, 2020; 18 pages; available at https://www.agilent.com/cs/library/applications/application-pesticide-residue-in-cannabis-with-lcms-us-5994-1734en-agilent.pdf.
(Continued)

*Primary Examiner* — Kiet T Nguyen
(74) *Attorney, Agent, or Firm* — Taft Stettinius & Hollister LLP

(57) ABSTRACT

A method for optimizing at least one parameter setting of at least one mass spectrometry device (110) operating at unit resolution is disclosed. The method comprises the following steps:

a) determining at least one analyte detection window for detecting an analyte of interest with the mass spectrometry device (110), wherein the analyte detection window is defined by a central mass to charge ratio value of the analyte and a predefined width, wherein the central mass to charge ratio value of the analyte is set to a theoretical mass to charge ratio value of the analyte of interest having more than one decimal place and/or a mass to charge ratio value of the analyte of interest determined by a high resolution mass spectrometry measurement having more than one decimal place;

b) determining at least one internal standard detection window for detecting an internal standard substance with the mass spectrometry device (110), wherein the internal standard detection window is defined by a central mass to charge ratio value of the internal standard substance and the pre-defined width, wherein the central mass to charge ratio value of the internal standard substance is set to a mass to charge ratio value (Continued)

of the internal standard substance calculated relative to the analyte of interest and having more than one decimal place and/or to a mass to charge ratio value of the internal standard substance determined by a high resolution mass spectrometry measurement having more than one decimal place.

15 Claims, 3 Drawing Sheets

(56) References Cited

FOREIGN PATENT DOCUMENTS

| | | | |
|---|---|---|---|
| JP | 2005300358 | A | 10/2005 |
| JP | 2011512534 | A | 4/2011 |
| JP | 2011513708 | A | 4/2011 |
| JP | 2019090654 | A | 6/2019 |
| JP | 2020177912 | A | 10/2020 |
| WO | 2016103388 | A1 | 6/2016 |

OTHER PUBLICATIONS

Anonymous; Validation of MRM pesticides from the Working Document SANCO/12745/2013 using three Multiresidue methods (QuEChERS, ethyl acetate and Dutch mini-Luke); 2019; 37 pages; available at https://www.eurl-pesticides.eu/userfiles/file/EurlFV/methods/EURL-FV-2019-m33.pdf.

Oeckl, Patrick et al.; Comparison of Internal Standard Approaches for SRM Analysis of Alpha-Synuclein in Cerebrospinal Fluid; Journal of Proteome Research; 2018; pp. 516-523; vol. 17.

Anderson, Leigh et al.; Quantitative Mass Spectrometric Multiple Reaction Monitoring Assays for Major Plasma Proteins; Molecular & Cellular Proteomics; 2006; pp. 573-588; vol. 5.

Wang, Miao et al.; Selection of internal standards for accurate quantification of complex lipid species in biological extracts by electrospray ionization mass spectrometry—What, how and why?; Mass Spectrometry Reviews; 2017; pp. 693-714; vol. 36.

International Preliminary Report on Patentability, The International Bureau of WIPO, International Patent Application No. PCT/EP2021/085190, Jun. 22, 2023, 11 pages.

* cited by examiner

METHOD FOR OPTIMIZING A PARAMETER SETTING OF AT LEAST ONE MASS SPECTROMETRY DEVICE

CROSS-REFERENCE TO RELATED APPLICATIONS

This application is a continuation of International PCT Application No. PCT/EP2021/085190 filed on Dec. 10, 2021, which claims priority to European Patent Application No. 20213473.0 filed on Dec. 11, 2020, the contents of each application are incorporated herein by reference in their entireties.

TECHNICAL FIELD

The invention relates to a method for optimizing at least one parameter setting of at least one mass spectrometry device, a mass spectrometry device, a computer program and a computer program product.

BACKGROUND ART

For performing assays using mass spectrometry (MS) instruments such as liquid chromatography coupled with mass spectrometry (LC-MS) or tandem mass spectrometry (LC-MS/MS) assay a setting of assay parameters need to be defined and/or set and optimized. The optimization may comprise tuning and/or adjusting several parameters. For example, the parameters to be optimized may be mass scale, in case of tandem MS multiple reaction monitoring (MRM) transition, ion source gas, curtain gas, ion spray voltage, temperature, declustering potential, entrance potential, focusing lens, pre-filter, ion energy, collision energy, collision gas, cell exit potentials, MS resolution, source gas flow, source gas pressure and the like. Specifically, for quantitative mass spectrometry, where experiments require quantitative data on one or more particular ions, the mass spectrometry method needs to be optimized for a specific analyte standard.

Most mass spectrometry systems use low-resolution mass filter and operate at unit resolution, i.e. resolution that is sufficient to separate two peaks one mass unit apart. For low resolution mass spectrometry systems like triple quadrupole MS method development often uses semi-automated optimization approaches are known where analyte specific parameter settings were determined. Usually a parameter to be optimized is the mass axis or detection window. Usually, adjustment of the mass axis is performed using infused tune compounds having ions with m/z known to the level of accuracy required. Typically, for the optimization of the mass scale, one decimal number is used for a mass to charge ratio of the ion species since unit mass resolution (±0.35 amu) with a mass axis accuracy of 0.1-0.2 amu is a accepted range. A more accurate setting is not applicable as experimental bias and error strongly affects the m/z ratios.

For quantitative mass spectrometric assays the use of internal standards is strongly recommended to achieve accurate results.

Although analyte and internal standard may have only minor differences of their physical and chemical properties, slight drifts of their ratios occur and directly affect result accuracy within a calibration interval. The reason of theses drifts is not fully understood, yet and it is commonly accepted to correct these drifts by a new calibration of the assay. By calibration the ratio between analyte and internal standard is brought in a mathematical relationship to the analyte quantity. Thus, firstly, the instrument mass axis may be adjusted to assure a properly working instrument. Secondly, tuning and/or method optimization may be performed to set up method for analyte and internal standard and assure sensitivity and selectivity. Subsequently, the method and/or assay may be calibrated to assure accurate results.

Problem to be Solved

It is therefore an objective of the present invention to provide a method for optimizing at least one parameter setting of at least one mass spectrometry device, a mass spectrometry device, a computer program and a computer program product, which avoid the above-described disadvantages of known methods, devices, computer programs and computer program products. In particular, the method and devices shall improve optimization stability such that calibration intervals can be prolonged.

SUMMARY

This problem is addressed by a method for optimizing at least one parameter setting of at least one mass spectrometry device, a mass spectrometry device, a computer program and a computer program product with the features of the independent claims. Advantageous embodiments which might be realized in an isolated fashion or in any arbitrary combinations are listed in the dependent claims as well as throughout the specification.

As used in the following, the terms “have”, “comprise” or “include” or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions “A has B”, “A comprises B” and “A includes B” may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms “at least one”, “one or more” or similar expressions indicating that a feature or element may be present once or more than once typically will be used only once when introducing the respective feature or element. In the following, in most cases, when referring to the respective feature or element, the expressions “at least one” or “one or more” will not be repeated, non-withstanding the fact that the respective feature or element may be present once or more than once.

Further, as used in the following, the terms “preferably”, “more preferably”, “particularly”, “more particularly”, “specifically”, “more specifically” or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by “in an embodiment of the invention” or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a method for optimizing at least one parameter setting of at least one mass spectrometry device operating at unit resolution is disclosed. Preferably, the method is a computer-implemented method.

The term "computer implemented method" as used herein is a broad term and is to be given its ordinary and customary meaning to a person of ordinary skill in the art and is not to be limited to a special or customized meaning. The term specifically may refer, without limitation, to a method involving at least one computer and/or at least one computer network. The computer and/or computer network may comprise at least one processor which is configured for performing at least one of the method steps of the method according to the present invention. Preferably each of the method steps is performed by the computer and/or computer network. The method may be performed completely automatically, specifically without user interaction. The term "automatically" as used herein is a broad term and is to be given its ordinary and customary meaning to a person of ordinary skill in the art and is not to be limited to a special or customized meaning. The term specifically may refer, without limitation, to a process which is performed completely by means of at least one computer and/or computer network and/or machine, in particular without manual action and/or interaction with a user.

The term "mass spectrometry" as used herein is a broad term and is to be given its ordinary and customary meaning to a person of ordinary skill in the art and is not to be limited to a special or customized meaning. The term specifically may refer, without limitation, to an analytical technique for determining a mass-to-charge ratio of ions. The mass spectrometry may be performed using the at least one mass spectrometry device being and/or comprising at least one mass analyzer. As used herein, the term "mass spectrometry device", is a broad term and is to be given its ordinary and customary meaning to a person of ordinary skill in the art and is not to be limited to a special or customized meaning. The term specifically may refer, without limitation, to an analyzer configured for detecting at least one analyte based on a mass-to-charge ratio (m/z).

The mass spectrometry device may be or may comprise at least one quadrupole analyzer. As used herein, the term "quadrupole mass analyzer" is a broad term and is to be given its ordinary and customary meaning to a person of ordinary skill in the art and is not to be limited to a special or customized meaning. The term specifically may refer, without limitation, to a mass analyzer comprising at least one quadrupole as mass filter. As used herein, the term "mass filter" is a broad term and is to be given its ordinary and customary meaning to a person of ordinary skill in the art and is not to be limited to a special or customized meaning. The term specifically may refer, without limitation, to a device configured for selecting ions injected to the mass filter according to their mass-to-charge ratio m/z. The mass filter comprises two pairs of electrodes. The electrodes may be rod-shaped, in particular cylindrical. In ideal case, the electrodes may be hyperbolic. The electrodes may be designed identical. The electrodes may be arranged in parallel extending along a common axis, e.g. a z axis. The quadrupole mass analyzer may comprise at least one power supply circuitry configured for applying at least one direct current (DC) voltage and at least one alternating current (AC) voltage between the two pairs of electrodes of the mass filter. The power supply circuitry may be configured for holding each opposing electrode pair at identical potential. The power supply circuitry may be configured for changing sign of charge of the electrode pairs periodically such that stable trajectories are only possible for ions within a certain mass-to-charge ratio m/z. Trajectories of ions within the mass filter can be described by the Mathieu differential equations. For measuring ions of different m/z values DC and AC voltage may be changed in time such that ions with different m/z values can be transmitted to a detector.

The mass spectrometry device may be configured for multiple reaction monitoring. The term "multiple reaction monitoring (MRM)", as used herein is a broad term and is to be given its ordinary and customary meaning to a person of ordinary skill in the art and is not to be limited to a special or customized meaning. The term specifically may refer, without limitation, to a method used in mass spectrometry, specifically in tandem mass spectrometry, in which multiple product ions front one or more precursor ions are monitored. As used herein, the term "monitoring" is a broad term and is to be given its ordinary and customary meaning to a person of ordinary skill in the art and is not to be limited to a special or customized meaning. The term specifically may refer, without limitation, to determining and/or detecting of multiple product ions. The quadrupole mass analyzer may comprise a plurality of quadrupoles. The mass spectrometry device may comprise a triple quadrupole mass spectrometry device comprising three quadrupoles.

The mass spectrometry device may comprise at least one ionization source. As used herein, the term "ionization source", also denoted as "ion source", is a broad term and is to be given its ordinary and customary meaning to a person of ordinary skill in the art and is not to be limited to a special or customized meaning. The term specifically may refer, without limitation, to a device configured for generating ions, e.g. from neutral gas molecules. The ionization source may be or may comprise at least one source selected from the group consisting of: at least one gas phase ionization source such as at least one electron impact (EI) source or at least one chemical ionization (CI) source; at least one desorption ionization source such as at least one plasma desorption (PDMS) source, at least one fast atom bombardment (FAB) source, at least one secondary ion mass spectrometry (SIMS) source, at least one laser desorption (LDMS) source, and at least one matrix assisted laser desorption (MALDI) source; at least one spray ionization source such as at least one thermospray (TSP) source, at least one atmospheric pressure chemical ionization (APCI) source, at least one electrospray (ESI), and at least one atmospheric pressure ionization (API) source.

The mass spectrometry device may comprise the at least one detector. As used herein, the term "detector", is a broad term and is to be given its ordinary and customary meaning to a person of ordinary skill in the art and is not to be limited to a special or customized meaning. The term specifically may refer, without limitation, to an apparatus configured for detecting incoming ions. The detector may be configured for detecting charged particles. The detector may be or may comprise at least one electron multiplier.

The mass spectrometry device may be or may comprise a liquid chromatography mass spectrometry device. The mass spectrometry device may be connected to and/or may comprise at least one liquid chromatography device, also denoted liquid chromatograph. The liquid chromatograph may be used as sample preparation for the mass spectrometry device. Other embodiments of sample preparation may be possible, such as at least one gas chromatograph. As used herein, the term "liquid chromatography mass spectrometry device" is a broad term and is to be given its ordinary and customary meaning to a person of ordinary skill in the art and is not to be limited to a special or customized meaning. The term specifically may refer, without limitation, to a combination of liquid chromatography with mass spectrometry. The mass spectrometry device may comprise at least one liquid chromatograph. The liquid chromatography mass spectrometry device may be or may comprise at least one high performance liquid chromatography (HPLC) device or at least one micro liquid chromatography (μLC) device. The liquid chromatography mass spectrometry device may comprise a liquid chromatography (LC) device and a mass spectrometry (MS) device, in the present case the mass filter, wherein the LC device and the mass filter are coupled via at least one interface. The interface coupling the LC device and the MS device may comprise the ionization source configured for generating of molecular ions and for transferring of the molecular ions into the gas phase. The interface may further comprise at least one ion mobility module arranged between the ionization source and the mass filter. For example, the ion mobility module may be a high-field asymmetric waveform ion mobility spectrometry (FAIMS) module.

As used herein, the term "liquid chromatography (LC) device" is a broad term and is to be given its ordinary and customary meaning to a person of ordinary skill in the art and is not to be limited to a special or customized meaning. The term specifically may refer, without limitation, to an analytical module configured to separate one or more analytes of interest of a sample from other components of the sample for detection of the one or mom analytes with the mass spectometry device. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest. The liquid chromatography mass spectrometry device may further comprise a sample preparation station for the automated pre-treatment and preparation of samples each comprising at least one analyte of interest.

The mass spectrometry device is configured for operating at unit resolution, also denoted unit mass resolution. The term "resolution" as used herein may refer to a measure of the ability of the mass spectrometry device to distinguish two peaks of different mass-to-charge ratios. The term "operating at unit resolution" as used herein is a broad term and is to be given its ordinary and customary meaning to a person of ordinary skill in the art and is not to be limited to a special or customized meaning. The term specifically may refer, without limitation, to suitability of the mass spectrometry device to separate two ions differing by one mass unit. The term "unit resolution" may refer to mass resolution in a range of ±0.1 to ±0.4 amu, preferably ±0.2 to ±0.35. Specifically, the mass spectrometry device may have a mass resolution of about ±0.35 amu. Specifically, the mass spectrometry device may be a so-called low resolution mass spectrometry device. In known low resolution mass spectrometry devices for the optimization of the mass scale one decimal number is used for a mass to charge ratio of the ion species since unit mass resolution, e.g. ±0.35 amu, with a mass axis accuracy of 0.1-0.2 amu is an accepted range. A more accurate setting is considered for known devices and methods as not applicable as experimental bias and error strongly affects the m/z ratios. As will be outlined in detail below, the present application proposes to use more than one decimal number. It was found that the usage of more than one decimal number for the m/z ratios lead to significant differences in signal intensity and improved precision for peak area ratios (analyte/internal standard). In particular real area ratios were less affected by drifts what leads to an improved calibration and/or robustness and stability. Thus, calibration intervals can be prolonged by applying this methodical feature.

The term "parameter setting" as used herein is a broad term and is to be given its ordinary and customary meaning to a person of ordinary skill in the art and is not to be limited to a special or customized meaning. The term specifically may refer, without limitation, to values and/or ranges of parameters defining at least one assay performed by the mass spectrometry device. The assay may be a quantitative assay. For example, the parameter setting may comprise one or more of the following parameters mass scale, MRM transition for tandem MS, cell exit potentials, MS resolution, source gas flow/pressure, with temperature source gas temperature, ion source gas, curtain gas, ion spray voltage, temperature, declustering potential, entrance potential, focusing lens, pre-filter, ion energy, collision energy, collision gas, and the like.

The term "optimizing" the parameter setting as used herein is a broad term and is to be given its ordinary and customary meaning to a person of ordinary skill in the art and is not to be limited to a special or customized meaning. The term specifically may refer, without limitation, to a process of solving at least one optimization problem. The optimizing may comprise evaluating and/or tuning and/or selecting at least one parameter of the parameter setting defining the assay. The optimizing may comprise selecting a best parameter value with regard to some criterion, e.g. minimal intensity loss of a measured peak or the like. The optimizing may comprise determining an extremum such as a maximization and/or minimization. The optimizing may comprise defining as optimum the most robust parameter setting, e g, a plateau in the graph. Specifically, the method may comprise optimizing an analyte detection window and an internal standard detection window, in particular their central mass to charge ratio values.

The method comprises the following steps which, as an example, may be performed in the given order:

a) determining at least one analyte detection window for detecting an analyte of interest with the mass spectrometry device, wherein the analyte detection window is defined by a central mass to charge ratio value of the analyte and a pre-defined width, wherein the central mass to charge ratio value of the analyte is set to a theoretical mass to charge ratio value of the analyte of interest having more than one decimal place and/or a mass to charge ratio value of the analyte of interest determined by a high resolution mass spectrometry measurement having more than one decimal place;

b) determining at least one internal standard detection window for detecting an internal standard substance with the mass spectrometry device, wherein the internal standard detection window is defined by a central mass to charge ratio value of the internal standard substance and the pre-defined width, wherein the central mass to charge ratio value of the internal standard substance is set to a mass to charge ratio value of the internal standard substance calculated relative to the analyte of interest and having more than one decimal place and/or to a mass to charge ratio value of the internal standard substance determined by a high resolution mass spectrometry measurement having more than one decimal place.

It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The mass spectrometry device may be configured for analyzing at least one sample comprising the analyte of interest. As used herein, the term "sample" is a broad term and is to be given its ordinary and customary meaning to a person of ordinary skill in the art and is not to be limited to a special or customized meaning. The term specifically may refer, without limitation, to an arbitrary test sample such as a biological sample and/or an internal standard sample. The sample may comprise one or more analytes of interest. For example, the sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, analytes of interest may be vitamins. vitamin D, drugs of abuse, therapeutic drugs, hormones, and metabolites in general.

For further details with respect to the sample, reference is made e.g. to EP 3 425 369 A1, the full disclosure is included herewith by reference. Other analytes of interest are possible.

The internal standard substance may be a structurally similar compound to the analyte of interest. For example, a sample may be pretreated by adding the at least one internal standard substance. Said sample may comprise the at least one internal standard substance with a known concentration. The internal standard substance may be or may comprise structurally similar compounds. The internal standard substance may be an isotopically labeled version of the analyte, preferably an isotopologue of the analyte of interest. The higher the structural similarity the better the performance.

As used herein, the term "analyte detection window" is a broad term and is to be given its ordinary and customary meaning to a person of ordinary skill in the art and is not to be limited to a special or customized meaning. The term specifically may refer, without limitation, to a mass to charge ratio range or frame in which the detection and/or measurement of the analyte of interest is performed.

As used herein, the term "internal standard detection window" is a broad term and is to be given its ordinary and customary meaning to a person of ordinary skill in the art and is not to be limited to a special or customized meaning. The term specifically may refer, without limitation, to a mass to charge ratio range or frame in which the detection and/or measurement of the internal standard substance is performed.

The each of the analyte detection window and/or the internal standard detection window may have an initial setting, e.g. stored in at least one database of the mass spectrometry device. As used herein, the term "setting" of the detection window is a broad term and is to be given its ordinary and customary meaning to a person of ordinary skill in the art and is not to be limited to a special or customized meaning. The term specifically may refer, without limitation, to values for one or both limits, in particular a lower mass to charge ratio limit and an upper mass to charge ratio limit, of the detection window. Specifically, the setting may comprise one or both of a value for a lower limit of the detection window, i.e. a mass to charge ratio at which the detection starts, and a value for an upper limit of the detection window, i.e. mass to charge ratio at which the detection stops. The analyte detection window is defined by a central mass to charge ratio value of the analyte and a pre-defined width. The predefined width may also be denoted as MS resolution. The internal standard detection window is defined by a central mass to charge ratio value of the internal standard substance and the pre-defined width. The term "central mass to charge ratio value" may refer to a center of the mass to charge ratio range or frame. The pre-defined width may be 0.7 amu (i.e. ±0.35 amu). However, other width may be possible.

The central mass to charge ratio value of the analyte is set to a theoretical mass to charge ratio value of the analyte of interest having more than one decimal place and/or a mass to charge ratio value of the analyte of interest determined by a high resolution mass spectrometry measurement having more than one decimal place. The central mass to charge ratio value of the internal standard substance is set to a mass to charge ratio value of the internal standard substance calculated relative to the analyte of interest having more than one decimal place and/or to a mass to charge ratio value of the internal standard substance determined by a high resolution mass spectrometry measurement having more than one decimal place. As used herein, the term "set to" may refer to a process of adjusting and/or tuning and/or selecting an initial central mass to charge ratio value to a more suitable value for the assay. For example, the theoretical mass to charge ratio of the analyte may be a calculated mass to charge ratio and/or may be obtained from at least one database. Additionally or alternatively, the charge ratio value of the analyte may be set to an experimental value. As used herein, the term "high resolution mass spectrometry measurement" is a broad term and is to be given its ordinary and customary meaning to a person of ordinary skill in the art and is not to be limited to a special or customized meaning. The term specifically may refer, without limitation, to a measurement performed using a high resolution mass spectrometry device. The high resolution mass spectrometry device may be configured for performing m/z-measurements having at least four decimal places, wherein at least three decimal places are significant. The high resolution mass spectrometry device may be configured for elucidating molecular formulas and/or measuring mass defect of molecules. In contrast to known optimization approaches, the method according to the present invention proposes a combination experimental and theoretical approaches. For example, mass to charge ratio values of the analyte may be calculated or at least determined by a high resolution MS measurement and the m/z values for the internal standard substance may be calculated relative to the analyte. Other parameters of the parameter setting of the mass spectrometry device like voltages may be determined experimentally.

The theoretical mass to charge ratio value of the analyte of interest has more than one decimal place and/or the mass to charge ratio value of the analyte of interest determined by a high resolution mass spectrometry measurement has more than decimal place. Preferably, the theoretical mass to charge ratio value of the analyte of interest has two decimal places and/or the mass to charge ratio value of the analyte of interest determined by a high resolution mass spectrometry measurement has two decimal places. The mass to charge ratio value of the internal standard substance calculated relative to the analyte of interest and/or the mass to charge ratio value of the internal standard substance determined by a high resolution mass spectrometry measurement may have two decimal places. More preferably, the theoretical mass to charge ratio value of the analyte of interest has three decimal places and/or the mass to charge ratio value of the analyte of interest determined by a high resolution mass spectrometry measurement has three decimal places. The mass to charge ratio value of the internal standard substance calculated relative to the analyte of interest and/or the mass to charge ratio value of the internal standard substance determined by a high resolution mass spectrometry measurement may have three decimal places.

Although low resolution MS systems were used, it was surprisingly found that the usage of more than one decimal number for the m/z ratios leads to that peak area ratios (analyte/internal standard) were less affected by drifts what leads to an improved calibration stability. Moreover, improved precision in signal intensity can be observed. Thus, calibration intervals can be prolonged by applying this methodical feature. Further evaluation showed that both molecular species differ in their mass defect what typically causes a deviation of the m/z ratio in the first or second decimal place. For isotopically labeled internal standards typically differences in the second decimal place occur. Although the resulting signal intensity is covered by initial calibration, a drifting mass axis leads to a drifting peak area ratio due to nonlinearity of the intensity function. This deviation causes an "uncalibrated" deviation, thus, a bias of the test result. Using more than one decimal number for m/z ratios, may reduce the performance difference between analyte and internal standard and significantly can decrease the occurring bias of the area ratio.

As outlined above, the mass spectrometry device may comprise three quadrupoles. In a first quadrupole Q1 a precursor ion, also denoted parent ion, may be isolated. The precursor ion may be an ion of interest which may be preselected with the first quadrupole Q1. Within a second quadrupole Q2 it may be fragmented into daughter ions, also denoted fragment ions product ions. A third quadrupole Q3 may be used for filtering and/or selecting said fragment ions. The determining of the analyte detection window and the internal standard detection window may be performed for the first quadrupole and the third quadrupole. The method may comprise determining analyte detection windows and internal standard detection windows for each of the first quadrupole Q1 and/or the third quadrupole Q3 of the triple quadrupole mass spectrometry device.

The method may comprise optimizing at least one further parameter for the detection of the analyte and the internal standard substance using at least one analyte sample comprising the analyte of interest. The further parameter may be, in particular, at least one transition-specific parameter. The further parameter for the detection of the internal standard substance may be harmonized to the further parameter for detection of the analyte determined using the analyte sample. The term "harmonized" as used herein is a broad term and is to be given its ordinary and customary meaning to a person of ordinary skill in the art and is not to be limited to a special or customized meaning. The term specifically may refer, without limitation, to setting the further parameter for the detection of the internal standard substance to the value of the further parameter for detection of the analyte. The further parameter may be at least one parameter selected from the group consisting of, ion source gas; spray gas; probe position; ion spray voltage; drying gas; declustering potential; curtain gas pressure or flow; entrance potential, focusing lenses; ion pre-filter; Q1 m/z value and resolution; ion energy, exit lenses; collision energy; collision gas; collision cell exit potential; Q3 m/z value and resolution; detector settings/voltage. For example, the further parameters may be optimized in the following order: 1, ion source gas, 1a. spray gas; quality/identity, temperature, flow/pressure; 1b. probe position (x, y, z position); 1c. ion spray voltage; 1d. drying gas; quality/identity, temperature, flow/pressure; 2. declustering potential; 3. curtain gas pressure/flow; 4. entrance potential; 5. focusing lenses; 6. ion pre-filter; 7. Q1 m/z value and resolution; 8. ion energy; 9. exit lenses; 10. focusing lenses; 11. ion pre-filter; 12. collision energy; 13. collision gas; quality/identity, pressure/flow; 14. collision cell exit potential; 15. focusing lenses; 16. ion pre-filter; 17. Q3 m/z value and resolution, 18. ion energy; 19. exit lenses; 20. detector settings/voltage. The further parameters may be optimized in the described order. However, other orders are feasible. For example, preliminary values for 1a-1d may be used for optimizing 2-19, 20 may be analyte non-specific. The declustering potential (DP) may a voltage applied to an orifice where ions enter the mass spectrometry device configured for preventing ions from clustering together. The entrance potential (EP) is applied at the entrance of the mass spectrometry device. The collision energy (CE) may refers to a rate of acceleration as the ions enter the second quadrupole Q2. The higher the collision energy, the greater the fragmentation. The collision cell potential (CXP) may be applied to focus and accelerate ions out of the second quadrupole Q2 and into the third quadrupole Q3. The ionspray voltage (IS) refers to a voltage applied to a tip of an ion spray needle at which the sample is ionized.

The method may comprise optimizing a plurality of parameters, in particular in addition to the analyte detections window and the internal standard detection window. The optimizing of the plurality of parameters may follow an optimization procedure. The optimization procedure may comprise the following steps i) determining an initial mass to charge ratio parameter of a parent ion of the analyte by running a first quadrupole of the mass spectrometry device in a mass scan mode using at least one analyte sample;
ii) optimizing a declustering potential by using the analyte sample and repeating the determining of the mass to charge ratio of the parent ion for determining a final mass to charge ratio parameter of the parent ion;
iii) determining initial mass to charge ratio parameters for product ions by running a third quadrupole of the mass spectrometry device in a mass scan mode using the analyte sample;
iv) optimizing a collision energy for product ions using the analyte sample;
v) optimizing cell exit potential for product ions using the analyte sample;
vi) repeating step iii) thereby determining final mass to charge ratio parameters for product ions;
vii) performing step a) thereby optimizing the determined final mass to charge ratio parameter of the parent ion and final mass to charge ratio parameters for product ions, wherein the final mass to charge ratio parameter of the parent ion is set to a theoretical mass to charge ratio value of the parent ion having more than one decimal place and/or a mass to charge ratio value of the parent ion determined by a high resolution mass spectrometry measurement having more than one decimal place, wherein the final mass to charge ratio parameters for product ions are set to the respective theoretical mass to charge ratio values of the product ions having more than one decimal place and/or respective mass to charge ratio values of the product ions determined by a high resolution mass spectrometry measurement having more than one decimal place;

viii) performing step b) thereby optimizing initial mass to charge ratio parameters of a parent ion and product ions of the internal standard substance, wherein the initial mass to charge ratio parameter of the parent ion of the internal standard substance is set to a mass to charge ratio value calculated relative to the analyte of interest and having more than one decimal place and the initial mass to charge ratio parameters of the product ions of the internal standard substance are set to mass to charge ratio values calculated relative to the analyte of interest and having more than one decimal place.

ix) harmonizing one or more of declustering potential, collision energy and cell exit potential for product ions of the internal standard substance to the collision energy for initial product ions and the cell exit potential for product ions of the analyte, respectively.

Step i) may be omitted and the theoretical values may be used. Alternatively, step i) may be performed for determining if the optimizing is properly working since it is necessary for step ii). For all other parameters default values may be used. By performing the method steps as outlined above, all other parameters may be directly or indirectly optimized.

The term “mass to charge ratio parameter” may refer to the detection window, in particular the central mass to charge ratio value.

In a further aspect of the invention, a method for quantitative multiple reaction monitoring is disclosed. The method comprises performing at least one quantitative assay on at least one mass spectrometry device operating at unit resolution using at least one parameter setting optimized by a method for optimizing at least one parameter setting according to the present invention. Thus, with respect to definitions and embodiments reference is made to definitions and embodiments outlined with respect to the method for optimizing at least one parameter setting.

In a further aspect, a mass spectrometry device is disclosed. The mass spectrometry device comprises at least one control unit configured for performing a method for optimizing at least one parameter setting according to the present invention and/or a method for quantitative multiple reaction monitoring according to the present invention. Thus, with respect to definitions and embodiments reference is made to definitions and embodiments outlined with respect to the method for optimizing at least one parameter setting.

As further used herein, the term “control unit” generally refers to an arbitrary device adapted to perform the method steps as described above, preferably by using at least one data processing device and, more preferably, by using at least one processor and/or at least one application-specific integrated circuit. Thus, as an example, the at least one control unit may comprise at least one data processing device having a software code stored thereon comprising a number of computer commands. The control unit may provide one or more hardware elements for performing one or more of the named operations and/or may provide one or more processors with software running thereon for performing one or more of the method steps.

The mass spectrometry device may comprise at least one liquid chromatography mass spectrometer device configured for multiple reaction monitoring. The mass spectrometry device, in particular the control unit, may comprise the at least one data base configured for storing at least one parameter setting, in particular initial parameter setting and/or the optimized parameter setting. The mass spectrometry device may furthermore comprise at least one evaluation device, wherein the evaluation device is configured for evaluating measurement signals thereby determining at least one measurement value, in particular a concentration. The evaluation device may be part of the control unit or may be a separate device.

Further disclosed and proposed herein is a computer program including computer-executable instructions for performing the methods according to the present invention in one or more of the embodiments enclosed herein when the program is executed on a computer or computer network. Specifically, the computer program may be stored on a computer-readable data carrier and/or on a computer-readable storage medium.

As used herein, the terms “computer-readable data carrier” and “computer-readable storage medium” specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps as indicated above may be performed by using a computer or a computer network, preferably by using a computer program.

Further disclosed and proposed herein is a computer program product having program code means, in order to perform the methods according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the methods according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the methods according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

- a computer or computer network comprising at least one processor, wherein the processor is adapted to perform the methods according to one of the embodiments described in this description,
- a computer loadable data structure that is adapted to perform the methods according to one of the embodiments described in this description while the data structure is being executed on a computer,
- a computer program, wherein the computer program is adapted to perform the methods according to one of the embodiments described in this description while the program is being executed on a computer,
- a computer program comprising program means for performing the methods according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the methods according to one of the embodiments described in this description after having been loaded into a main and/or working storage of a computer or of a computer network, and
- a computer program product having program code means, wherein the program code means can be stored or are stored on a storage medium, for performing the methods according to one of the embodiments described in this description, if the program code means are executed on a computer or on a computer network.

Summarizing and without excluding further possible embodiments, the following embodiments may be envisaged:

Embodiment 1. A method for optimizing at least one parameter setting of at least one mass spectrometry device operating at unit resolution, wherein the method comprises the following steps:

a) determining at least one analyte detection window for detecting an analyte of interest with the mass spectrometry device, wherein the analyte detection window is defined by a central mass to charge ratio value of the analyte and a pre-defined width, wherein the central mass to charge ratio value of the analyte is set to a theoretical mass to charge ratio value of the analyte of interest having more than one decimal place and/or a mass to charge ratio value of the analyte of interest determined by a high resolution mass spectrometry measurement having more than one decimal place;

b) determining at least one internal standard detection window for detecting an internal standard substance with the mass spectrometry device, wherein the internal standard detection window is defined by a central mass to charge ratio value of the internal standard substance and the pre-defined width, wherein the central mass to charge ratio value of the internal standard substance is set to a mass to charge ratio value of the internal standard substance calculated relative to the analyte of interest and having more than one decimal place and/or to a mass to charge ratio value of the internal standard substance determined by a high resolution mass spectrometry measurement having more than one decimal place.

Embodiment 2 The method according to the preceding embodiment, wherein the theoretical mass to charge ratio value of the analyte of interest has two decimal places and/or the mass to charge ratio value of the analyte of interest determined by a high resolution mass spectrometry measurement has two decimal places, wherein the mass to charge ratio value of the internal standard substance calculated relative to the analyte of interest and/or the mass to charge ratio value of the internal standard substance determined by a high resolution mass spectrometry measurement has two decimal places.

Embodiment 3 The method according to any one of the preceding embodiments, wherein the theoretical mass to charge ratio value of the analyte of interest has at least three decimal places and/or the mass to charge ratio value of the analyte of interest determined by a high resolution mass spectrometry measurement has at least three decimal places, wherein the mass to charge ratio value of the internal standard substance calculated relative to the analyte of interest and/or the mass to charge ratio value of the internal standard substance determined by a high resolution mass spectrometry measurement has at least three decimal places.

Embodiment 4 The method according to any one of the preceding embodiments, wherein the internal standard substance is a structurally similar compound to the analyte of interest.

Embodiment 5 The method according to the preceding embodiment, wherein the internal standard substance is a isotopically labeled version of the analyte.

Embodiment 6 The method according to any one of the preceding embodiments, wherein the pre-defined width is 0.7 amu.

Embodiment 7 The method according to any one of the preceding embodiments, wherein the mass spectrometry device is configured for multiple reaction monitoring.

Embodiment 8 The method according to the preceding embodiment, wherein the mass spectrometry device comprises a triple quadrupole mass spectrometry device comprising three quadrupoles.

Embodiment 9 The method according to the preceding embodiment, wherein the method comprises determining analyte detection windows and internal standard detection windows for each of a first quadrupole Q1 and/or a third quadrupole Q3 of the triple quadrupole mass spectrometry device.

Embodiment 10 The method according to any one of the preceding embodiments, wherein the method comprises optimizing at least one further parameter of the parameter setting, wherein the further parameter for the detection of the internal standard substance is harmonized to the further parameter for detection of the analyte determined using the analyte sample.

Embodiment 11 The method according to the preceding embodiment, wherein the further parameter is at least one parameter selected from the group consisting of: ion source gas; spray gas; probe position; ion spray voltage; drying gas; declustering potential; curtain gas pressure or flow; entrance potential; focusing lenses; ion pre-filter, Q1 m/z value and resolution; ion energy; exit lenses; collision energy; collision gas; collision cell exit potential; Q3 m/z value and resolution; detector settings/voltage.

Embodiment 12 The method according to any one of the preceding embodiments, wherein the method comprises optimizing a plurality of parameters, wherein optimizing of the plurality of parameters follows an optimization procedure, wherein the optimization procedure comprises the following steps i) determining an initial mass to charge ratio parameter of a parent ion of the analyte by running a first quadrupole of the mass spectrometry device in a mass scan mode using at least one analyte sample;

ii) optimizing a declustering potential by using the analyte sample and repeating the determining of the mass to charge ratio of the parent ion for determining a final mass to charge ratio parameter of the parent ion;

iii) determining initial mass to charge ratio parameters for product ions by running a third quadrupole of the mass spectrometry device in a mass scan mode using the analyte sample;

iv) optimizing a collision energy for product ions using the analyte sample;

v) optimizing cell exit potential for product ions using the analyte sample;

vi) repeating step iii) thereby determining final mass to charge ratio parameters for product ions;

vii) performing step a) thereby optimizing the determined final mass to charge ratio parameter of the parent ion and final mass to charge ratio parameters for product ions, wherein the final mass to charge ratio parameter of the parent ion is set to a theoretical mass to charge ratio value of the parent ion having more than one decimal place and/or a mass to charge ratio value of the parent ion determined by a high resolution mass spectrometry measurement having more than one decimal place, wherein the final mass to charge ratio parameters for product ions are set to the respective theoretical mass to charge ratio values of the product ions having more than one decimal place and/or respective mass to charge ratio values of the product ions determined by a high resolution mass spectrometry measurement having more than one decimal place;

viii) performing step b) thereby optimizing initial mass to charge ratio parameters of a parent ion and product ions of the internal standard substance, wherein the initial mass to charge ratio parameter of the parent ion of the internal standard substance is set to a mass to charge ratio value calculated relative to the analyte of interest and having more than one decimal place and the initial mass to charge ratio parameters of the product ions of the internal standard substance are set to mass to charge ratio values calculated relative to the analyte of interest and having more than one decimal place;

ix) determining at least one internal standard detection window for detecting an internal standard substance with the mass spectrometry device, wherein the internal standard detection window is defined by a central mass to charge ratio value of the internal standard substance and the pre-defined width, wherein the central mass to charge ratio value of the internal standard substance is set to a mass to charge ratio value of the internal standard substance calculated relative to the analyte of interest and having more than one decimal place and/or to a mass to charge ratio value of the internal standard substance determined by a high resolution mass spectrometry measurement having more than one decimal place;

x) harmonizing one or more of declustering potential, collision energy and cell exit potential for product ions of the internal standard substance to the collision energy for product ions and the cell exit potential for product ions of the analyte, respectively.

Embodiment 13 Method for quantitative multiple reaction monitoring, wherein the method comprises performing at least one quantitative assay on at least one mass spectrometry device operating at unit resolution using at least one parameter setting optimized by a method for optimizing at least one parameter setting according to any one of the preceding embodiments.

Embodiment 14 Mass spectrometry device, wherein the mass spectrometry device comprises at least one control unit configured for performing a method for optimizing at least one parameter setting according to embodiments 1 to 12 and/or a method for quantitative multiple reaction monitoring according to embodiment 13.

Embodiment 15 A computer program comprising instructions which, when the program is to executed by a control unit of the mass spectrometry device according to the preceding embodiment, cause the control unit to perform a method for optimizing at least one parameter setting according to embodiments 1 to 12 and/or a method for quantitative multiple reaction monitoring according to embodiment 13.

Embodiment 16 A computer-readable storage medium comprising instructions which, when the program is executed by a control unit of the mass spectrometry device according to any one of the preceding embodiments referring to mass spectrometry device, cause the control unit to perform a method for optimizing at least one parameter setting according to embodiments 1 to 12 and/or a method for quantitative multiple reaction monitoring according to embodiment 13.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

Figure 3:
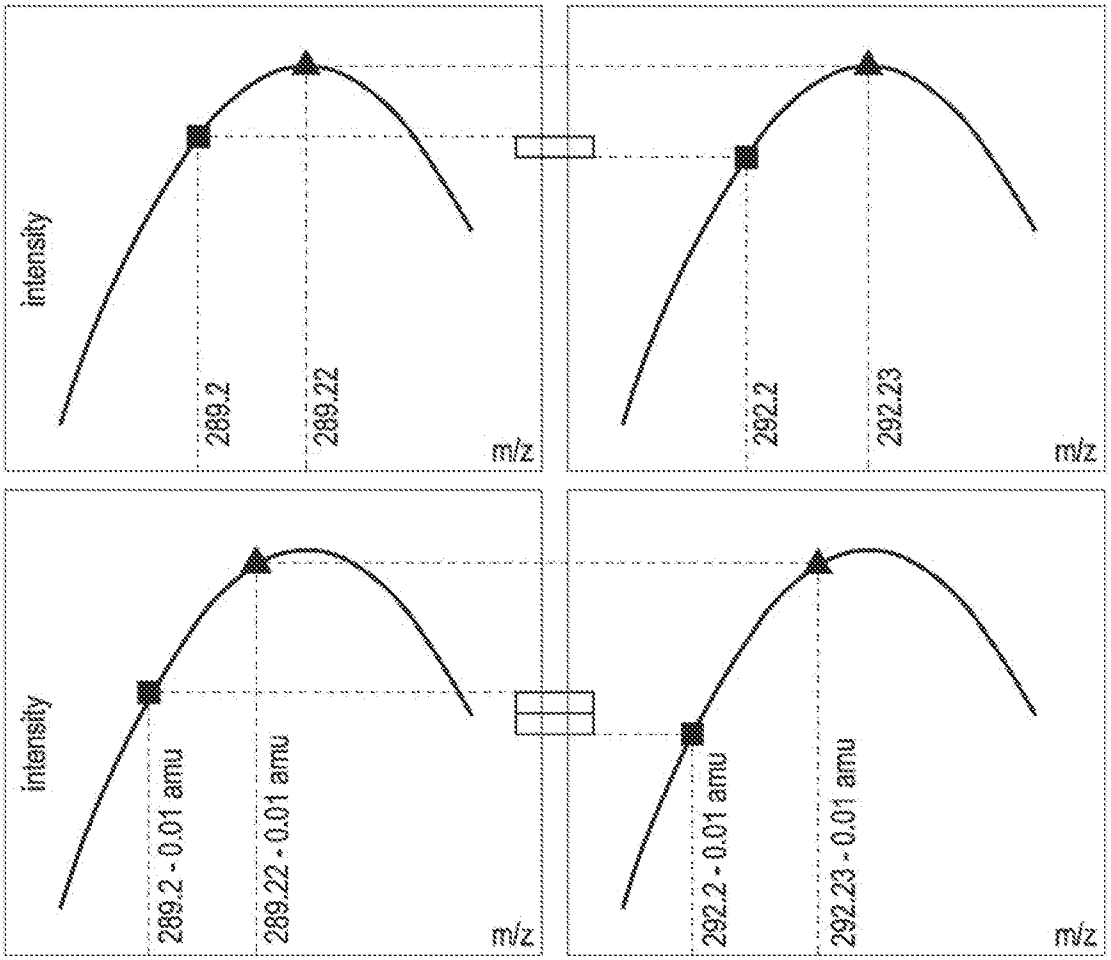

FIG. 3 theoretical impact of using one vs. two decimal places.

Figure 4A:
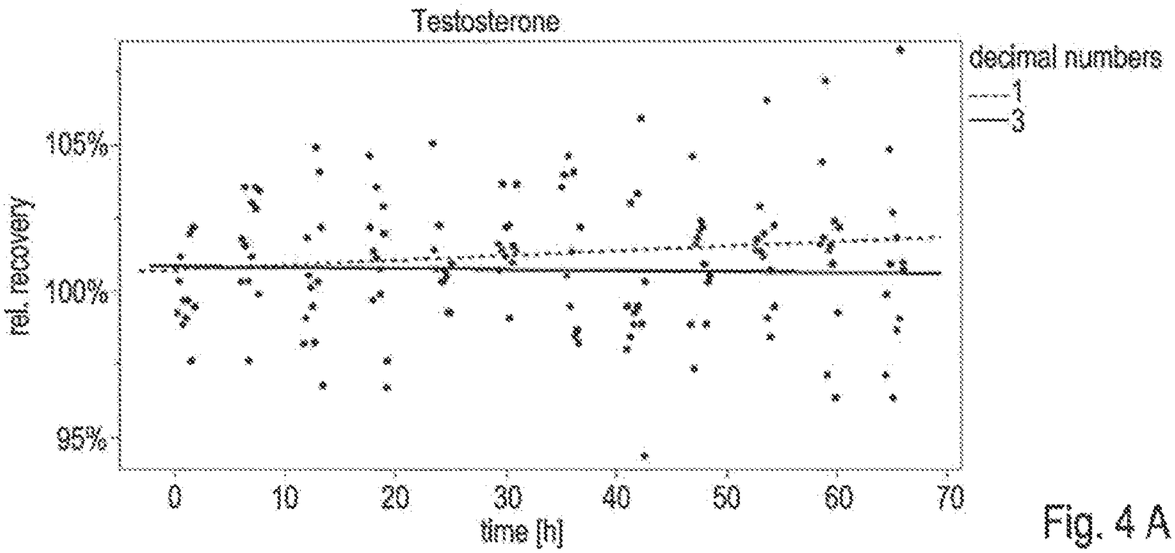
Figure 4B:
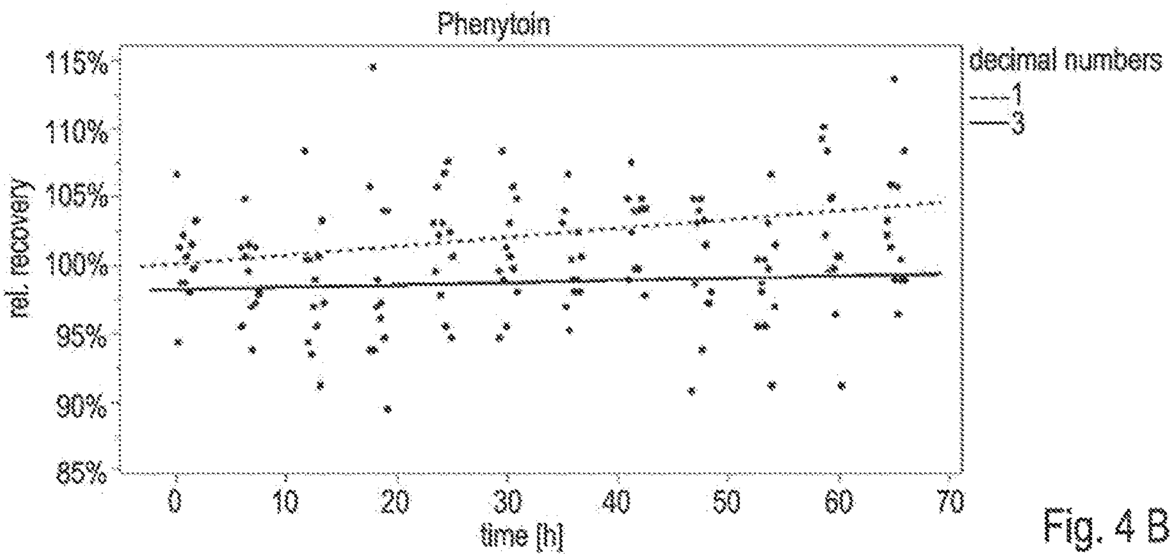
Figure 4C:
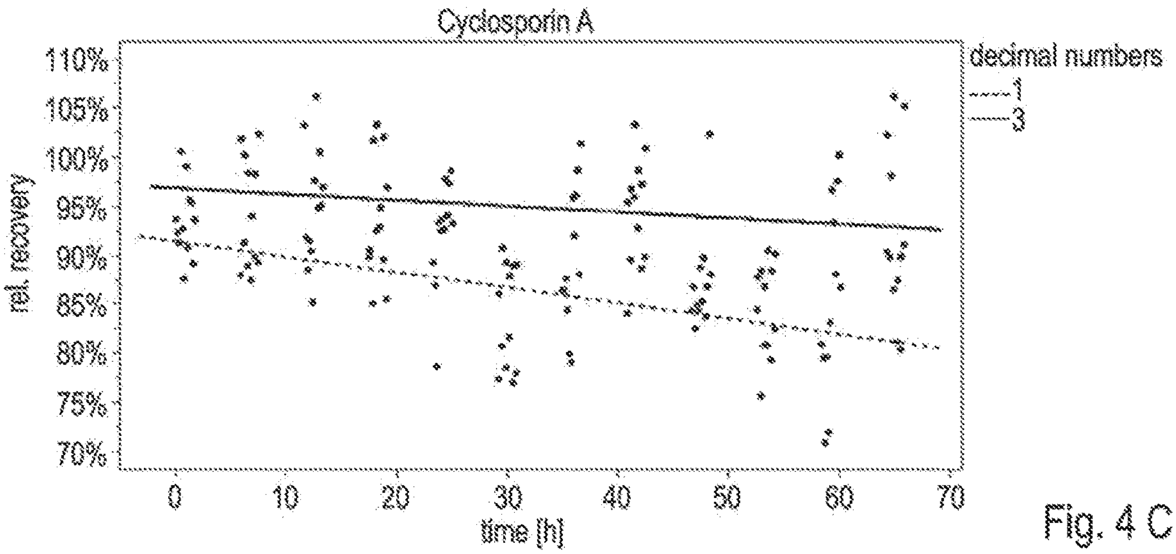

FIG. 4A to 4C show experimental data tor one vs. three decimal places.

DETAILED DESCRIPTION OF THE EMBODIMENTS

Figure 1:
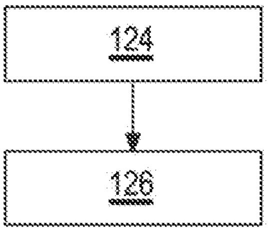
FIG. 1 shows an embodiment of a method a method for optimizing at least one parameter setting.

FIG. 1 shows a flow chart of an embodiment of a method a, in particular computer-implemented, method for optimizing at least one parameter setting of at least one mass spectrometry device 110 operating at unit resolution.

Figure 2:
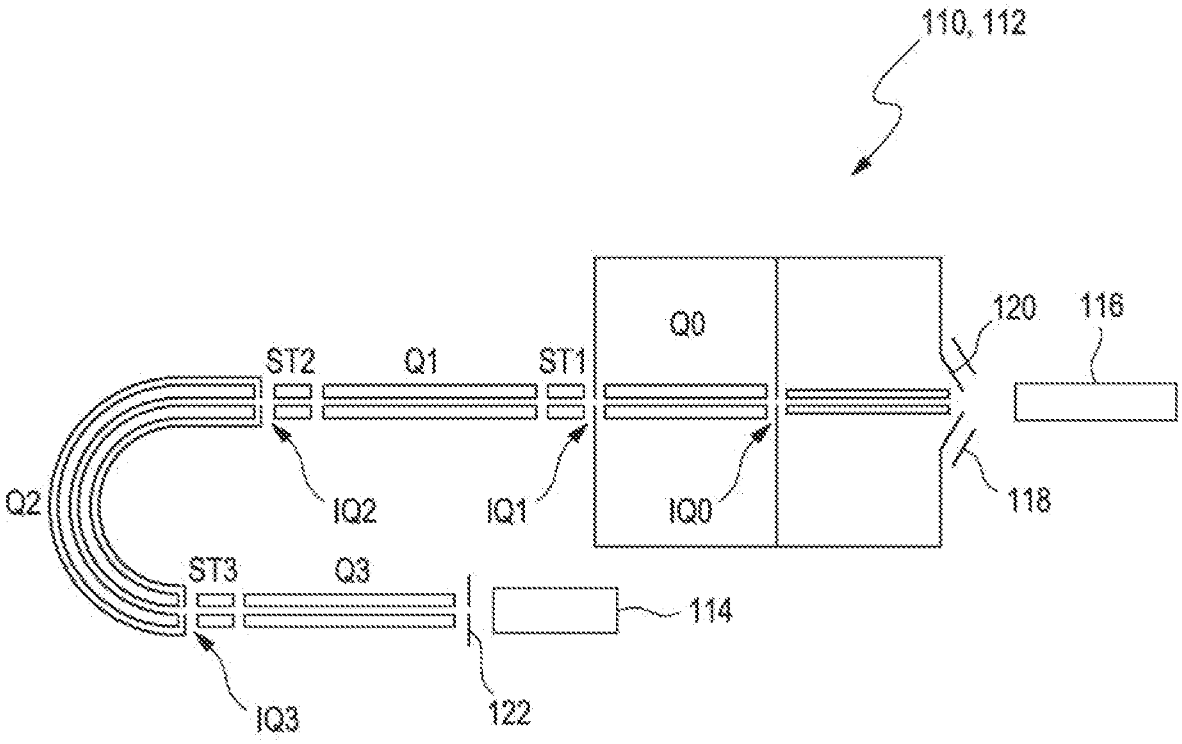
FIG. 2 shows an embodiment of a mass spectrometry device according to the present invention.

An embodiment of the mass spectrometry device 110 according to the present invention is shown in FIG. 2. The mass spectrometry device 110 may be an analyzer configured for detecting at least one analyte based on a mass-to-charge ratio (m/z).

The mass spectrometry device 110 may be or may comprise at least one quadrupole analyzer 112. The quadrupole mass analyzer 112 is or comprises at least one mass analyzer comprising at least one quadrupole as mass filter. The mass filter may be configured for selecting ions injected to the mass filter according to their mass-to-charge ratio m/z. The mass filter comprises two pairs of electrodes. The electrodes may be rod-shaped, in particular cylindrical. In ideal case, the electrodes may be hyperbolic. The electrodes may be designed identical. The electrodes may be arranged in parallel extending along a common axis, e.g. a z axis. The quadrupole mass analyzer 112 may comprise at least one power supply circuitry configured for applying at least one direct current (DC) voltage and at least one alternating current (AC) voltage between the two pairs of electrodes of the mass filter. The power supply circuitry may be configured for holding each opposing electrode pair at identical potential. The power supply circuitry may be configured for changing sign of charge of the electrode pairs periodically such that stable trajectories are only possible for ions within a certain mass-to-charge ratio m/z. Trajectories of ions within the mass filter can be described by the Mathieu differential equations. For measuring ions of different m/z values DC and AC voltage may be changed in time such that ions with different m/z values can be transmitted to a detector 114.

The mass spectrometry device 110 may be configured for multiple reaction monitoring. The quadrupole mass analyzer 112 may comprise a plurality of quadrupoles. The mass spectrometry device 110 may comprise a triple quadrupole mass spectrometry device comprising three quadrupoles, denoted Q1, Q2, Q3 in FIG. 2.

The mass spectrometry device 110 may comprise at least one ionization source 116. The ionization source 116 may be configured for generating ions, e.g. from neutral gas molecules. The ionization source 116 may be or may comprise at least one source selected from the group consisting oft at least one gas phase ionization source such as at least one electron impact (EI) source or at least one chemical ionization (CI) source; at least one desorption ionization source such as at least one plasma desorption (PDMS) source, at least one fast atom bombardment (FAB) source, at least one secondary ion mass spectrometry (SIMS) source, at least one laser desorption (IDMS) source, and at least one matrix assisted laser desorption (MALDI) source; at least one spray ionization source such as at least one thermospray (TSP) source, at least one atmospheric pressure chemical ionization (APCI) source, at least one electrospray (EST), and at least one atmospheric pressure ionization (API) source.

The ions enter the mass spectrometry device 110 at a curtain plate 118 and at an orifice plate 120. The mass spectrometry device 110 may comprise a quadrupole ion guide in a first vacuum stage. Subsequent, the ions pass through an aperture (IQ0) and reach a second vacuum stage having an additional quadrupole ion guide (Q0), and an additional aperture (IQ1, or ST1). In a first quadrupole Q1 a precursor ion, also denoted parent ion, may be isolated. The precursor ion may be an ion of interest which may be preselected with the first quadrupole Q1. Within a second quadrupole Q2, in particular a collision cell of the second quadrupole Q2, the precursor ion may be fragmented into daughter ions, also denoted fragment ions or product ions. A third quadrupole Q3 may be used for filtering and/or selecting said fragment ions. The Q2 quadrupole is separated from the first quadrupole Q1 and the third quadrupole Q3 by interquad lenses IQ2 (or ST2) and IQ3 (or ST3). The fragment ions may pass an exit lens 122 and impinge on the detection 114. The detector 114 may be configured for detecting incoming ions. The detector 114 may be configured for detecting charged particles. The detector 114 may be or may comprise at least one electron multiplier.

The mass spectrometry device 110 may be or may comprise a liquid chromatography mass spectrometry device, not shown in FIG. 2. The mass spectrometry device 110 may be connected to and/or may comprise at least one liquid chromatography device, also denoted liquid chromatograph. The liquid chromatograph may be used as sample preparation for the mass spectrometry device 110. Other embodiments of sample preparation may be possible, such as at least one gas chromatograph. The liquid chromatography mass spectrometry device may be or may comprise at least one high performance liquid chromatography (HPLC) device or at least one micro liquid chromatography (μLC) device. The liquid chromatography mass spectrometry device may comprise a liquid chromatography (LC) device and a mass spectrometry (MS) device, in the present case the mass filter, wherein the LC device and the mass filter are coupled via at least one interface. The interface coupling the LC device and the MS device may comprise the ionization source 116 configured for generating of molecular ions and for transferring of the molecular ions into the gas phase. The interface may further comprise at least one ion mobility module arranged between the ionization source 116 and the mass filter. For example, the ion mobility module may be a high-field asymmetric waveform ion mobility spectrometry (FAIMS) module.

The mass spectrometry device 110 is configured for operating at unit resolution, also denoted unit mass resolution. The mass spectrometry device 110 is configured for separating two ions differing by one mass unit. The unit resolution may be in a range of ±0.1 to ±0.4 amu, preferably ±0.2 to ±0.35. Specifically, the mass spectrometry device 110 may have a mass resolution of about ±0.35 amu. Specifically, the mass spectrometry device 110 may be a so-called low resolution mass spectrometry device. In known low resolution mass spectrometry devices for the optimization of the mass scale one decimal number is used for a mass to charge ratio of the ion species since unit mass resolution, e.g. ±0.35 amu, with a mass axis accuracy of 0.1-0.2 amu is a common setting. A more accurate setting is considered for known devices and methods as not applicable as experimental bias and error strongly affects the m/z ratios. As will be outlined in detail below, the present application proposes to use more than one decimal number. It was found that the usage of more than one decimal number for the m/z ratios lead to significant differences in signal intensity and improved precision for peak area ratios (analyte/internal standard). In particular real area ratios were less affected by drifts what leads to an improved calibration and/or robustness and stability. Thus, calibration intervals can be prolonged by applying this methodical feature.

The parameter setting may comprise values and/or ranges of parameters defining at least one assay performed by the mass spectrometry device 110. The assay may be a quantitative assay. For example, the parameter setting may comprise one or more of the following parameters mass scale, MRM transition for tandem MS, cell exit potentials. MS resolution, source gas flow/pressure, with temperature source gas temperature, ion source gas, curtain gas, ion spray voltage, temperature, declustering potential, entrance potential, focusing lens, pre-filter, ion energy, collision energy, collision gas, and the like.

The optimizing of the parameter setting may comprise a process of solving at least one optimization problem. The optimizing may comprise evaluating and/or tuning and/or selecting at least one parameter of the parameter setting defining the assay. The optimizing may comprise selecting a best parameter value with regard to some criterion, e.g. minimal intensity loss of a measured peak or the like. The optimizing may comprise determining an extremum such as a maximization and/or minimization. The optimizing may comprise defining as optimum the most robust parameter setting, e.g. a plateau in the graph. Specifically, the method may comprise optimizing an analyte detection window and an internal standard detection window, in particular their central mass to charge ratio values.

As shown in FIG. 1, the method comprises the following steps which, as an example, may be performed in the given order.

a) (reference number 124) determining at least one analyte detection window for detecting an analyte of interest with the mass spectrometry device 110, wherein the analyte detection window is defined by a central mass to charge ratio value of the analyte and a pre-defined width, wherein the central mass to charge ratio value of the analyte is set to a theoretical mass to charge ratio value of the analyte of interest having more than one decimal place and/or a mass to charge ratio value of the analyte of interest determined by a high resolution mass spectrometry measurement having more than one decimal place, b) (reference number 126) determining at least one internal standard detection window for detecting an internal standard substance with the mass spectrometry device 110, wherein the internal standard detection window is defined by a central mass to charge ratio value of the internal standard substance and the pre-defined width, wherein the central mass to charge ratio value of the internal standard substance is set to a mass to charge ratio value of the internal standard substance calculated relative to the analyte of interest and having more than one decimal place and/or to a mass to charge ratio value of the internal standard substance determined by a high resolution mass spectrometry measurement having more than one decimal place.

As outlined above, the mass spectrometry device 110 may comprise three quadrupoles. The determining of the analyte detection window and the internal standard detection window may be performed for the first quadrupole and the third quadrupole. The method may comprise determining analyte detection windows and internal standard detection windows for each of the first quadrupole Q1 and/or the third quadrupole Q3 of the triple quadrupole mass spectrometry device 110.

The mass spectrometry device 110 may be configured for analyzing at least one sample comprising the analyte of interest. The sample may be an arbitrary test sample such as a biological sample and/or an internal standard sample. The sample may comprise one or more analytes of interest. For example, the sample may be selected from the group consisting of a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, analytes of interest may be vitamins, vitamin D, drugs of abuse, therapeutic drugs, hormones, and metabolites in general.

For further details with respect to the sample, reference is made e.g. to EP 3 425 369 A1, the full disclosure is included herewith by reference. Other analytes of interest are possible.

The internal standard substance may be a structurally similar compound to the analyte of interest. For example, a sample may be pretreated by adding the at least one internal standard substance. Said sample may comprise the at least one internal standard substance with a known concentration. The internal standard substance may be or may comprise structurally similar compounds. The internal standard substance may be an isotopically labeled versions of the analyte, preferably an isotopologue of the analyte of interest. The higher the structural similarity the better the performance.

The analyte detection window may be a mass to charge ratio range or frame in which the detection and/or measurement of the analyte of interest is performed. The internal standard detection window is a mass to charge ratio range or frame in which the detection and/or measurement of the internal standard substance is performed. The each of the analyte detection window and/or the internal standard detection window may have an initial setting, e.g. stored in at least one database of the mass spectrometry device 119. The setting of the respective detection window may comprise values for one or both limits, in particular a lower mass to charge ratio limit and an upper mass to charge ratio limit, of the detection window. Specifically, the setting may comprise one or both of a value for a lower limit of the detection window, i.e. a mass to charge ratio at which the detection starts, and a value for an upper limit of the detection window, i.e. mass to charge ratio at which the detection stops. The analyte detection window is defined by a central mass to charge ratio value of the analyte and a pre-defined width. The internal standard detection window is defined by a central mass to charge ratio value of the internal standard substance and the pre-defined width. The central mass to charge ratio value may be a center of the mass to charge ratio range or frame. The pre-defined width may be 0.7 amu (i.e. ±0.35 amu). However, other width may be possible.

The central mass to charge ratio value of the analyte is set to a theoretical mass to charge ratio value of the analyte of interest having more than one decimal place and/or a mass to charge ratio value of the analyte of interest determined by a high resolution mass spectrometry measurement having more than one decimal place. The central mass to charge ratio value of the internal standard substance is set to a mass to charge ratio value of the internal standard substance calculated relative to the analyte of interest having more than one decimal place and/or to a mass to charge ratio value of the internal standard substance determined by a high resolution mass spectrometry measurement having more than one decimal place. For example, the theoretical mass to charge ratio of the analyte may be a calculated mass to charge ratio and/or may be obtained from at least one database. Additionally or alternatively, the charge ratio value of the analyte may be set to an experimental value. The high resolution mass spectrometry measurement may comprise a measurement performed using a high resolution mass spectrometry device. The high resolution mass spectrometry device may be configured for performing m/z-measurements having at least four decimal places, wherein at least three decimal places are significant. The high resolution mass spectrometry device may be configured for elucidating molecular formulas and/or measuring mass defect of molecules. In contrast to known optimization approaches, the method according to the present invention proposes a combination experimental and theoretical approaches. For example, mass to charge ratio values of the analyte may be calculated or at least determined by a high resolution MS measurement and the m/z values for the internal standard substance may be calculated relative to the analyte. Other parameters of the parameter setting of the mass spectrometry device 110 like voltages may be determined experimentally.

The theoretical mass to charge ratio value of the analyte of interest has more than one decimal place and/or the mass to charge ratio value of the analyte of interest determined by a high resolution mass spectrometry measurement has more than decimal place. The theoretical mass to charge ratio value of the analyte of interest has two decimal places and/or the mass to charge ratio value of the analyte of interest determined by a high resolution mass spectrometry measurement has two decimal places. The mass to charge ratio value of the internal standard substance calculated relative to the analyte of interest and/or the mass to charge ratio value of the internal standard substance determined by a high resolution mass spectrometry measurement may have two decimal places. The theoretical mass to charge ratio value of the analyte of interest has three decimal places and/or the mass to charge ratio value of the analyte of interest determined by a high resolution mass spectrometry measurement has three decimal places. The mass to charge ratio value of the internal standard substance calculated relative to the analyte of interest and/or the mass to charge ratio value of the internal standard substance determined by a high resolution mass spectrometry measurement may have three decimal places. The theoretical mass to charge ratio value of the analyte of interest has more than three decimal places and/or the mass to charge ratio value of the analyte of interest determined by a high resolution mass spectrometry measurement has more than three decimal places. The mass to charge ratio value of the internal standard substance calculated relative to the analyte of interest and/or the mass to charge ratio value of the internal standard substance determined by a high resolution mass spectrometry measurement may have more than three decimal places.

Although low resolution MS systems were used, it was surprisingly fond that the usage of more than one decimal number for the m/z ratios leads to that peak area ratios (analyte/internal standard) were less affected by drifts what leads to an improved calibration stability. Moreover, improved precision in signal intensity can be observed. Thus, calibration intervals can be prolonged by applying this methodical feature. Further evaluation showed that both molecular species differ in their mass defect what typically causes a deviation of the m/z ratio in the first or second decimal place. For isotopically labeled internal standards typically differences in the second decimal place occur. Although the resulting signal intensity is covered by initial calibration, a drifting mass axis leads to a drifting peak area ratio due to nonlinearity of the intensity function. This deviation causes an “uncalibrated” deviation, thus, a bias of the test result. Using more than one decimal number for m/z ratios, may reduce the performance difference between analyte and internal standard and significantly can decrease the occurring bias of the area ratio.

FIG. 3 shows in the two upper plots results of a simulation of relative signal intensity vs m/z using a correctly adjusted mass axis for (left plot) an analyte using one decimal place (square) and two decimal places (triangle) and for (right plot) an internal standard substance using one decimal place (square) and two decimal places (triangle). In case of two decimal places no difference in relative signal intensity can be observed. In case of only one decimal place a deviation can be found which is covered by assay calibration. FIG. 3 shows in the lower two plots results of a simulation of intensity vs m/z after mass axis shift of 0.01 amu for (left plot) an analyte using one decimal place (square) and two decimal places (triangle) and for (right plot) an internal standard substance using one decimal place (square) and two decimal places (triangle). Again, in case of two decimal places no difference can be observed. However, for only one decimal place a larger deviation can be observed. The drifting mass axis leads to a drilling peak area ratio due to nonlinearity of the intensity function. This deviation causes an “uncalibrated” deviation, thus a bias of the test result. This simulation shows that using more than one decimal number for m/z ratios, may reduce the performance difference between analyte and internal standard and significantly can decrease the occurring bias of the area ratio.

FIGS. 4A to 4C show experimental data for one vs. three decimal places for the following analytes Testosterone (FIG. 4A), Cyclosporin A (FIG. 4B), Phenytoin (FIG. 4C). For each experiment three sample×six replicates×twelve blocks giving 216 sample processings within 66 h were performed with assay calibration at t=0 h. A bias analysis was performed comprising calculating of the relative recovery of each sample to its known target value. In addition a precision analysis was performed comprising calculating of coefficients of variations (cv).

For Testosterone the following experimental results were obtained:

| | 3 decimal numbers | 1 decimal number |
|---|---|---|
| recovery after 66 h | 100.7% | 101.7% |
| drift (delta recovery) | −0.1% | +1% |
| cv | 2.00% | 2.18% |

For Cyclosporin A the following experimental results were obtained:

| | 3 decimal numbers | 1 decimal number |
|---|---|---|
| recovery after 66 h | 90.3% | 104.2% |
| drift (delta recovery) | +1.1% | +4.0% |
| cv | 3.34% | 4.14% |

For Phenytoin the following experimental results were obtained:

| | 3 decimal numbers | 1 decimal number |
|---|---|---|
| recovery after 66 h | 92.3% | 81.7% |
| drift (delta recovery) | −3.9% | −10.0% |
| cv | 4.31% | 4.37% |

Thus, for each analyte it is shown that robustness can be significantly increased by using three decimal numbers for MRM transitions instead of one. The bias is smaller over the time such that it is possible to increase calibration stability and to reduce optimization frequency. Moreover, precision can be slightly improved using three decimal numbers for MRM transitions instead of one. The cv is smaller resulting in higher precision.

LIST OF REFERENCE NUMBERS

110 mass spectrometry device
112 quadrupole mass analyzer
114 detector
116 ionization source
118 curtain plate
120 curtain plate 118 and at an orifice plate
122 exit lens
124 step a)
126 step b)

The invention claimed is:

1. A method for optimizing at least one parameter setting of at least one mass spectrometry device operating at unit resolution, the method comprising:

a) determining at least one analyte detection window for detecting an analyte of interest with the mass spectrometry device, wherein the analyte detection window is defined by a central mass to charge ratio value of the analyte and a pre-defined width, wherein the central mass to charge ratio value of the analyte is set to a theoretical mass to charge ratio value of the analyte of interest having more than one decimal place and/or a mass to charge ratio value of the analyte of interest determined by a high resolution mass spectrometry measurement having more than one decimal place;

b) determining at least one internal standard detection window for detecting an internal standard substance with the mass spectrometry device, wherein the internal standard detection window is defined by a central mass to charge ratio value of the internal standard substance and the pre-defined width, wherein the central mass to charge ratio value of the internal standard substance is set to a mass to charge ratio value of the internal standard substance calculated relative to the analyte of interest and having more than one decimal place and/or to a mass to charge ratio value of the internal standard substance determined by a high resolution mass spectrometry measurement having more than one decimal place.

2. The method according to claim 1, wherein the theoretical mass to charge ratio value of the analyte of interest has two decimal places and/or the mass to charge ratio value of the analyte of interest determined by a high resolution mass spectrometry measurement has two decimal places, wherein the mass to charge ratio value of the internal standard substance calculated relative to the analyte of interest and/or the mass to charge ratio value of the internal standard substance determined by a high resolution mass spectrometry measurement has two decimal places.

3. The method according to claim 1, wherein the theoretical mass to charge ratio value of the analyte of interest has at least three decimal places and/or the mass to charge ratio value of the analyte of interest determined by a high resolution mass spectrometry measurement has at least three decimal places, wherein the mass to charge ratio value of the internal standard substance calculated relative to the analyte of interest and/or the mass to charge ratio value of the internal standard substance determined by a high resolution mass spectrometry measurement has at least three decimal places.

4. The method according to claim 1, wherein the internal standard substance is a structurally similar compound to the analyte of interest.

5. The method according to claim 4, wherein the internal standard substance is an isotopically labeled version of the analyte.

6. The method according to claim 1, wherein the mass spectrometry device is configured for multiple reaction monitoring.

7. The method according to claim 6, wherein the mass spectrometry device comprises a triple quadrupole mass spectrometry device comprising three quadrupoles.

8. The method according to claim 7, wherein the method comprises determining analyte detection windows and internal standard detection windows for each of a first quadrupole Q1 and/or a third quadrupole Q3 of the triple quadrupole mass spectrometry device.

9. The method according to claim 1, wherein the method comprises optimizing at least one further parameter of the parameter setting, wherein the further parameter for the detection of the internal standard substance is harmonized to the further parameter for detection of the analyte determined using the analyte sample.

10. The method according to claim 9, wherein the further parameter is at least one parameter selected from the group consisting of ion source gas, spray gas, probe position, ion spray voltage, drying gas, declustering potential, curtain gas pressure or flow, entrance potential, focusing lenses, ion pre-filter, Q1 m/z value and resolution, ion energy, exit lenses, collision energy, collision gas, collision cell exit potential, Q3 m/z value and resolution, and detector settings/voltage.

11. The method according to claim 1, wherein the method comprises optimizing a plurality of parameters, wherein optimizing of the plurality of parameters follows an optimization procedure, wherein the optimization procedure comprises:

i) determining an initial mass to charge ratio parameter of a parent ion of the analyte by running a first quadrupole of the mass spectrometry device in a mass scan mode using at least one analyte sample;

ii) optimizing a declustering potential by using the analyte sample and repeating the determining of the mass to charge ratio of the parent ion for determining a final mass to charge ratio parameter of the parent ion;

iii) determining initial mass to charge ratio parameters for product ions by running a third quadrupole of the mass spectrometry device in a mass scan mode using the analyte sample;

iv) optimizing a collision energy for product ions using the analyte sample;

v) optimizing cell exit potential for product ions using the analyte sample;

vi) repeating step iii) thereby determining final mass to charge ratio parameters for product ions;

vii) performing step a) thereby optimizing the determined final mass to charge ratio parameter of the parent ion and final mass to charge ratio parameters for product ions, wherein the final mass to charge ratio parameter of the parent ion is set to a theoretical mass to charge ratio value of the parent ion having more than one decimal place and/or a mass to charge ratio value of the parent ion determined by a high resolution mass spectrometry measurement having more than one decimal place, wherein the final mass to charge ratio parameters for product ions are set to the respective theoretical mass to charge ratio values of the product ions having more than one decimal place and/or respective mass to charge ratio values of the product ions determined by a high resolution mass spectrometry measurement having more than one decimal place;

viii) performing step b) thereby optimizing initial mass to charge ratio parameters of a parent ion and product ions of the internal standard substance, wherein the initial mass to charge ratio parameter of the parent ion of the internal standard substance is set to a mass to charge ratio value calculated relative to the analyte of interest and having more than one decimal place and the initial mass to charge ratio parameters of the product ions of the internal standard substance are set to mass to charge ratio values calculated relative to the analyte of interest and having more than one decimal place;

ix determining at least one internal standard detection window for detecting an internal standard substance with the mass spectrometry device, wherein the internal standard detection window is defined by a central mass to charge ratio value of the internal standard substance and the pre-defined width, wherein the central mass to charge ratio value of the internal standard substance is set to a mass to charge ratio value of the internal standard substance calculated relative to the analyte of interest and having more than one decimal place and/or to a mass to charge ratio value of the internal standard substance determined by a high resolution mass spectrometry measurement having more than one decimal place;

x) harmonizing one or more of declustering potential, collision energy and cell exit potential for product ions of the internal standard substance to the collision energy for product ions and the cell exit potential for product ions of the analyte, respectively.

12. A method for quantitative multiple reaction monitoring, wherein the method comprises performing at least one quantitative assay on at least one mass spectrometry device operating at unit resolution using at least one parameter setting optimized by a method for optimizing at least one parameter setting according to claim 1.

13. A mass spectrometry device, wherein the mass spectrometry device comprises at least one control unit configured for performing a method for optimizing at least one parameter setting according to claim 1.

14. A computer program comprising instructions which, when the program is executed by a control unit of the mass spectrometry device according to claim 1, causes the control unit to perform a method for optimizing at least one parameter setting according to claim 1.

15. A computer-readable storage medium comprising instructions which, when the program is executed by a control unit of the mass spectrometry device according to claim 1, causes the control unit to perform a method for optimizing at least one parameter setting according to claim 1.

* * * * *